US012628746B2

(12) United States Patent
Mandrafina

(10) Patent No.: US 12,628,746 B2
(45) Date of Patent: May 19, 2026

(54) COUPLED MULTI-PURPOSE DEVICE, FOR THE RUNNING INSTALLATION OF VINEYARD ACCESSORIES, IN PARTICULAR STAKES

(71) Applicant: Georges Mandrafina, Ourem (PT)

(72) Inventor: Georges Mandrafina, Ourem (PT)

( * ) Notice: Subject to any disclaimer, the term of this patent is extended or adjusted under 35 U.S.C. 154(b) by 254 days.

(21) Appl. No.: 18/253,157

(22) PCT Filed: Nov. 16, 2021

(86) PCT No.: PCT/EP2021/081778

§ 371 (c)(1),
(2) Date: Jun. 12, 2023

(87) PCT Pub. No.: WO2022/101493

PCT Pub. Date: May 19, 2022

(65) Prior Publication Data

US 2023/0413742 A1 Dec. 28, 2023

(30) Foreign Application Priority Data

Nov. 16, 2020 (FR) ........................................ 2011704
Nov. 16, 2020 (FR) ........................................ 2011705

(51) Int. Cl.
*A01G 17/00* (2006.01)
*A01G 17/16* (2006.01)

(52) U.S. Cl.
CPC .................................... *A01G 17/16* (2013.01)

(58) Field of Classification Search
CPC .............. A01G 17/16; B27L 7/06; E02D 7/08
See application file for complete search history.

(56) References Cited

U.S. PATENT DOCUMENTS

| | | | | |
|---|---|---|---|---|
| 4,412,570 A | * | 11/1983 | Nickerson ................. | B27L 7/00 144/195.1 |
| 11,673,288 B2 | * | 6/2023 | Coolbaugh ............... | B27L 7/06 144/195.1 |
| 11,713,591 B2 | * | 8/2023 | Tanner ...................... | E02D 7/08 173/28 |
| 2014/0124097 A1 | * | 5/2014 | Banjo ....................... | B27L 7/00 144/193.1 |
| 2023/0117936 A1 | * | 4/2023 | Kugler ................. | F16M 11/046 173/217 |
| 2023/0413742 A1 | * | 12/2023 | Mandrafina .............. | A01C 5/06 |

FOREIGN PATENT DOCUMENTS

| | | |
|---|---|---|
| FR | 2554669 A1 | 5/1985 |
| GB | 2447785 A | 9/2008 |

* cited by examiner

*Primary Examiner* — Lee D Wilson
(74) *Attorney, Agent, or Firm* — Greer, Burns & Crain, Ltd.

(57) ABSTRACT

A multi-purpose device for the running installation of vineyard accessories, in particular stakes/markers, comprising a frame mounted on wheels and intended to be coupled to traction mechanism, following a direction of travel F, wherein it comprises driving-in mechanism with a twin hammer, one for the stakes and one for the markers.

16 Claims, 16 Drawing Sheets

[Fig. 1]
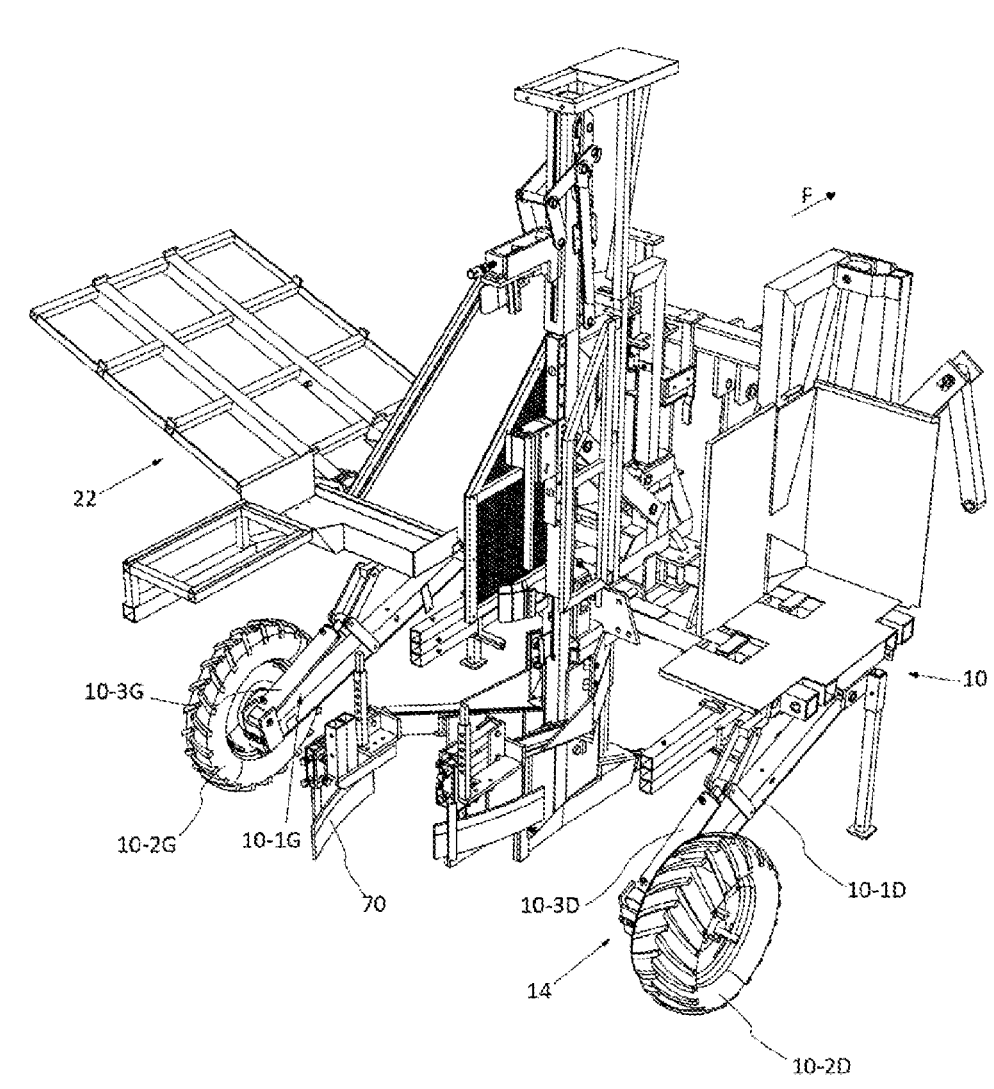

[Fig. 2]
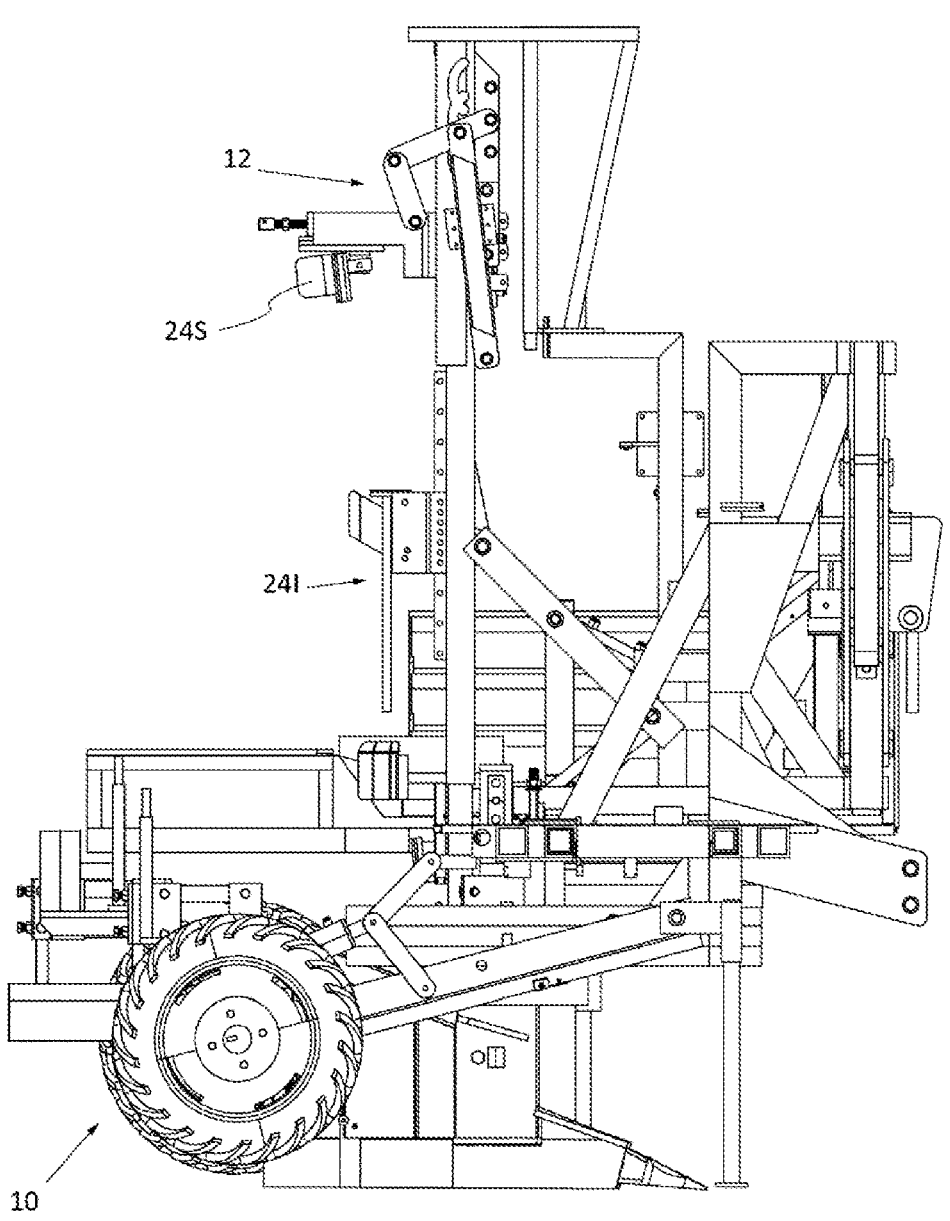

[Fig. 3A]
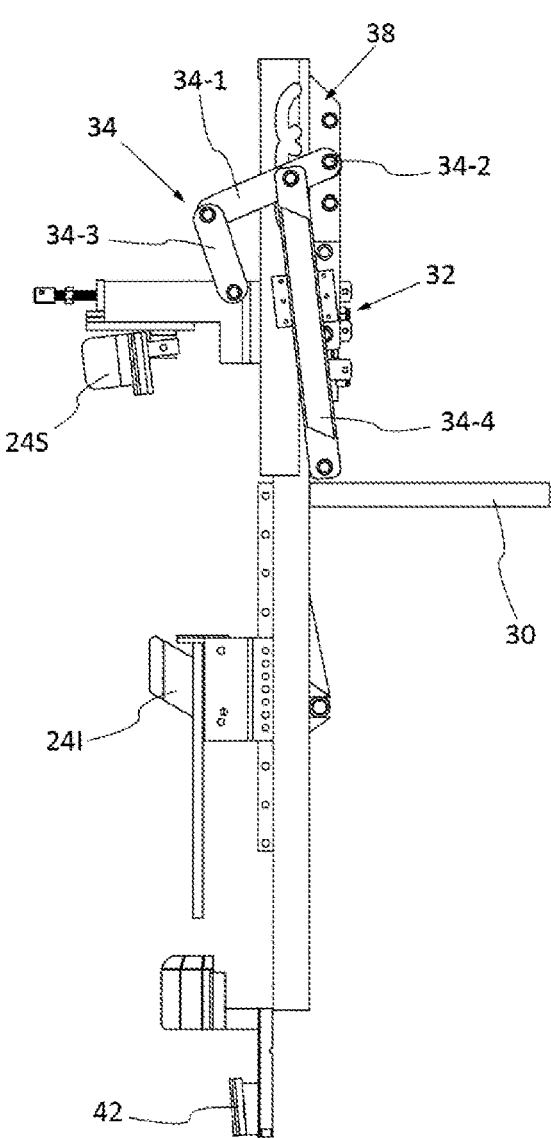

[Fig 3B]
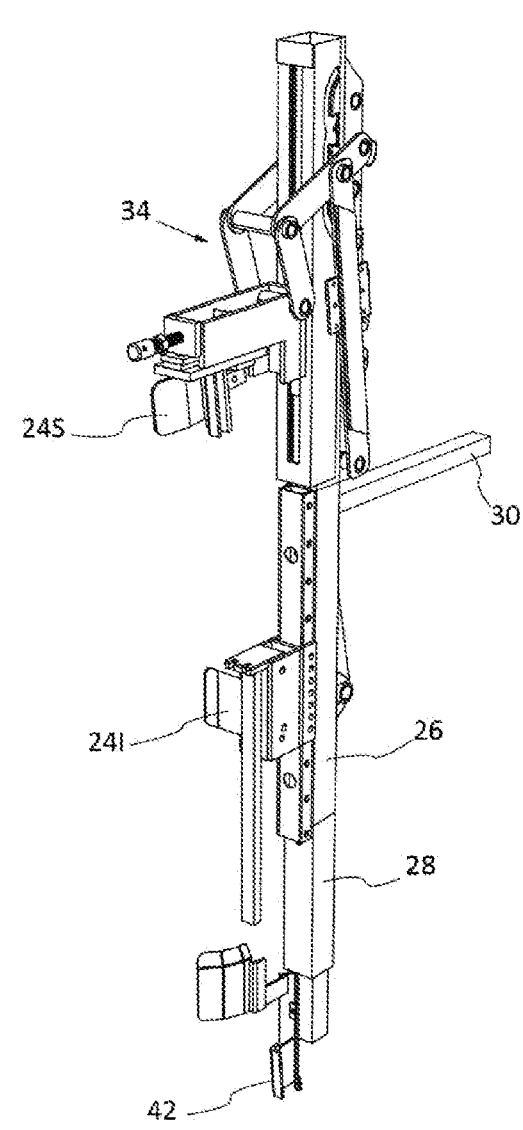

[Fig 3C]
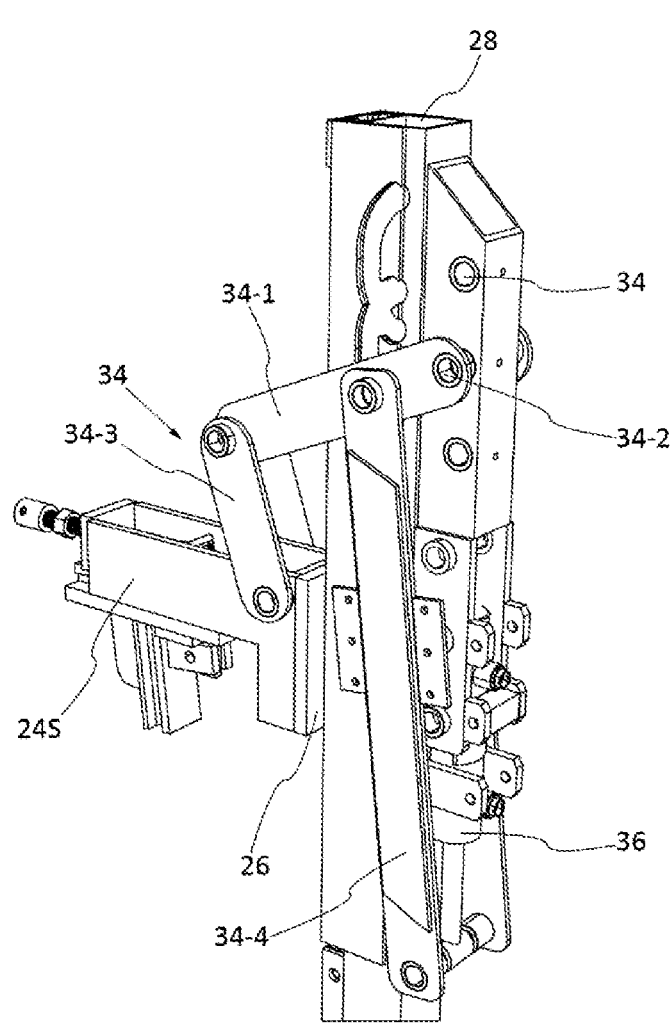

[Fig 4A]
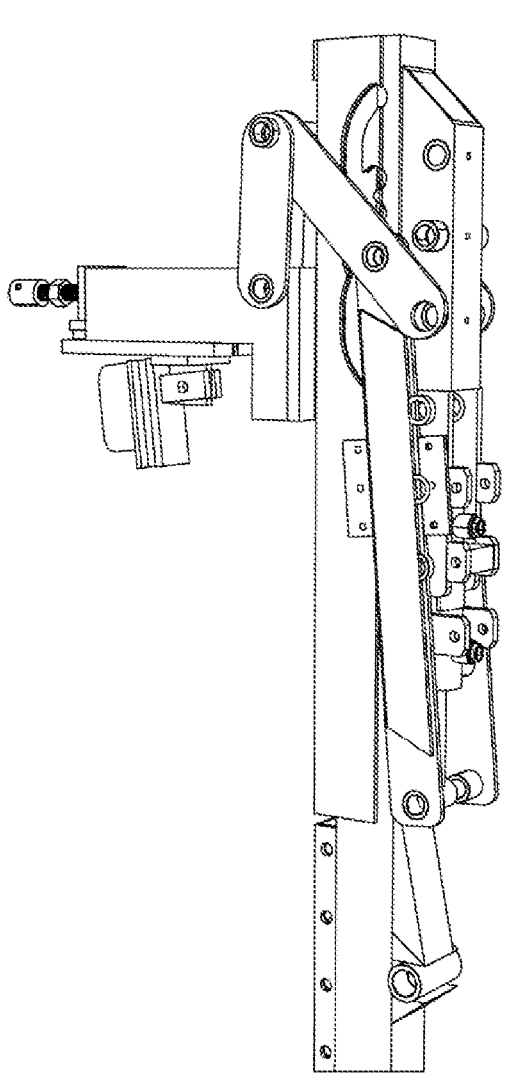

[Fig 4B]
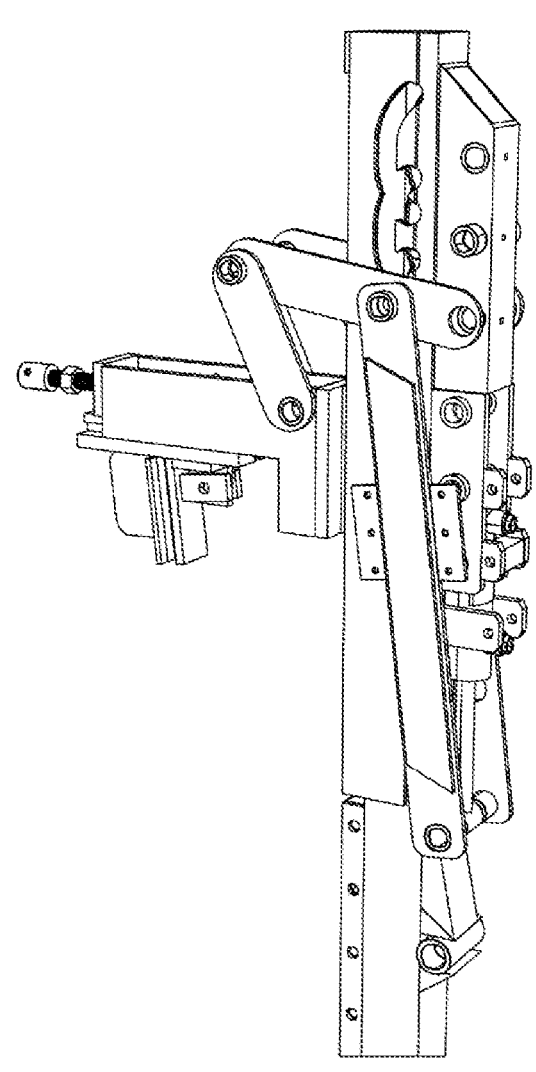

[Fig 4C]
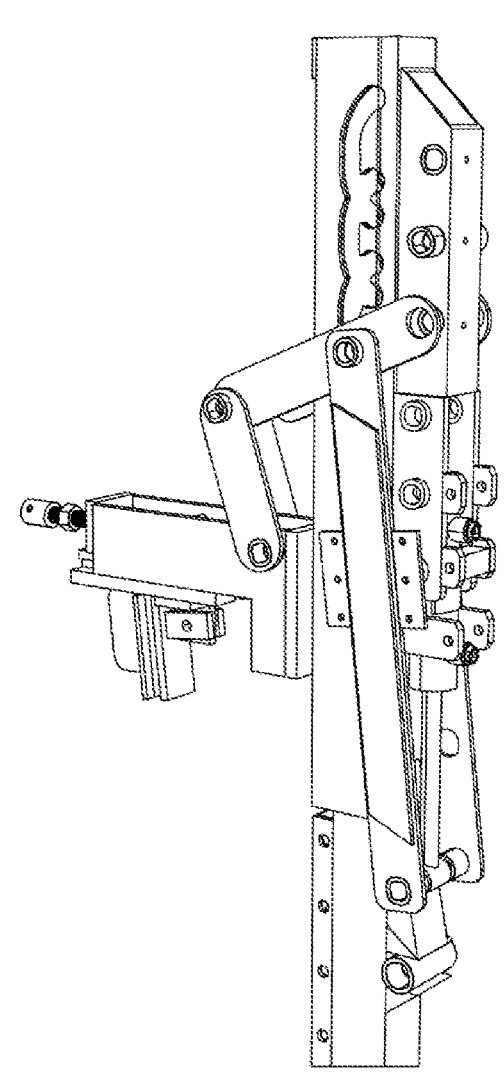

[Fig 5]
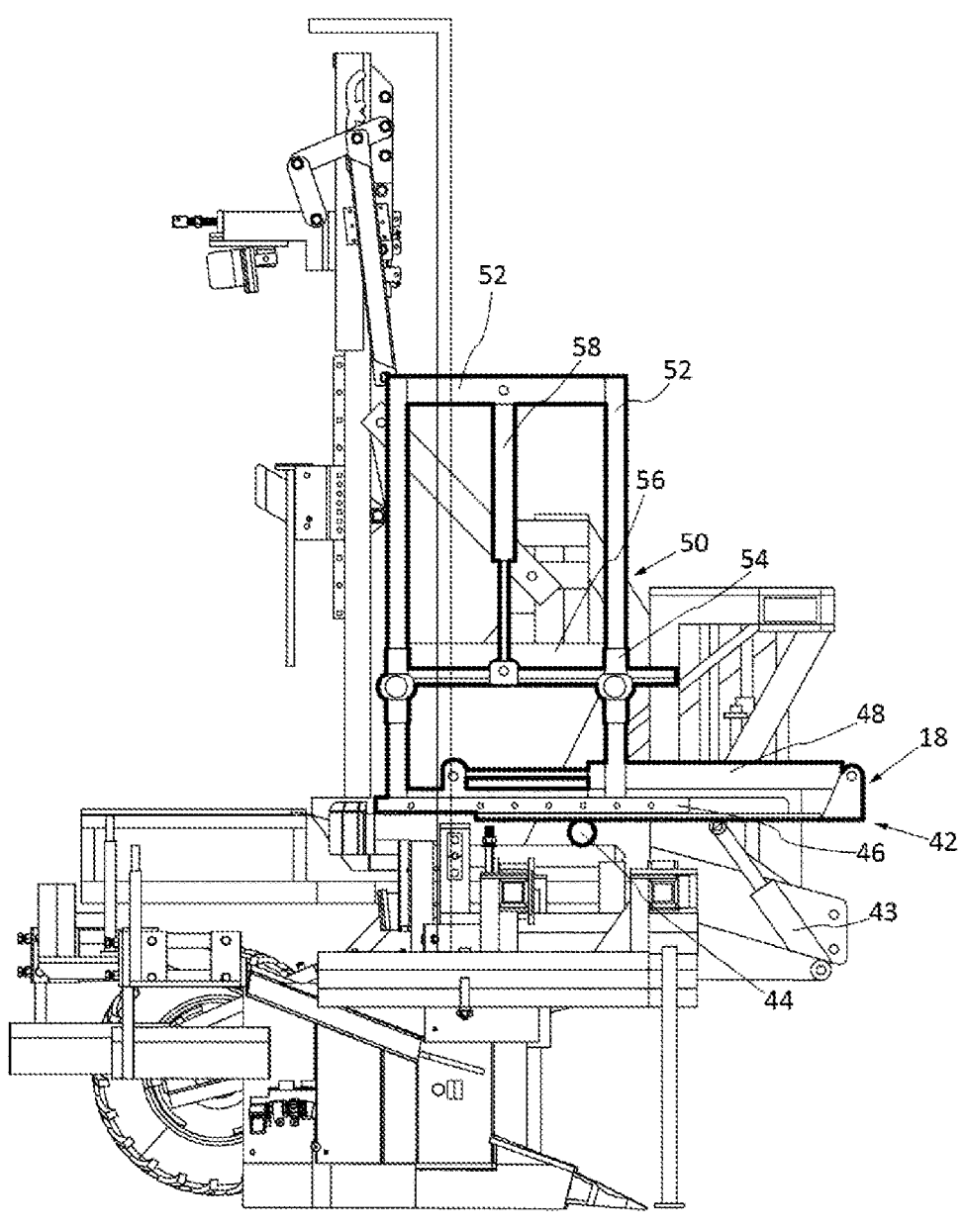

[Fig 6]
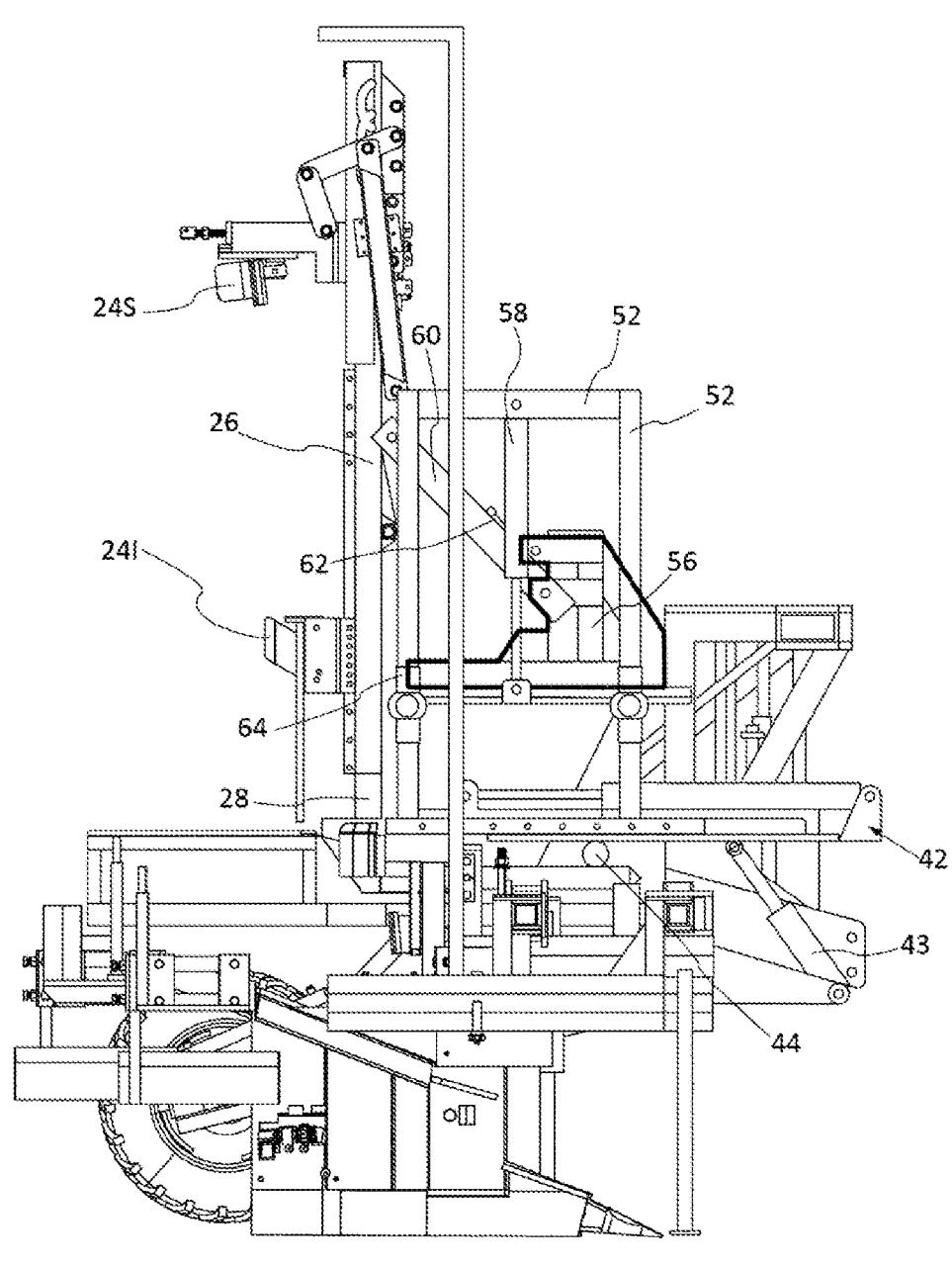

[Fig 7A]
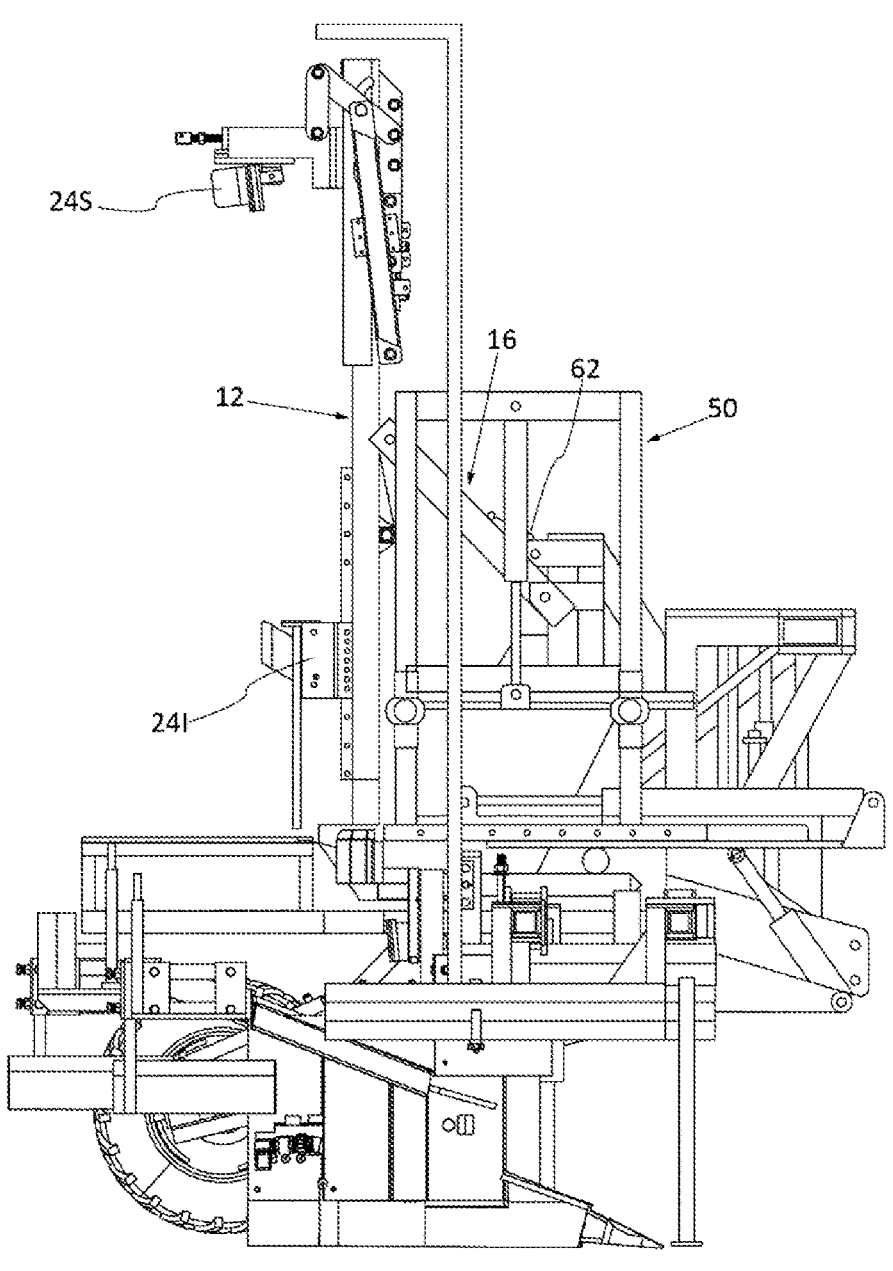

[Fig 7B]
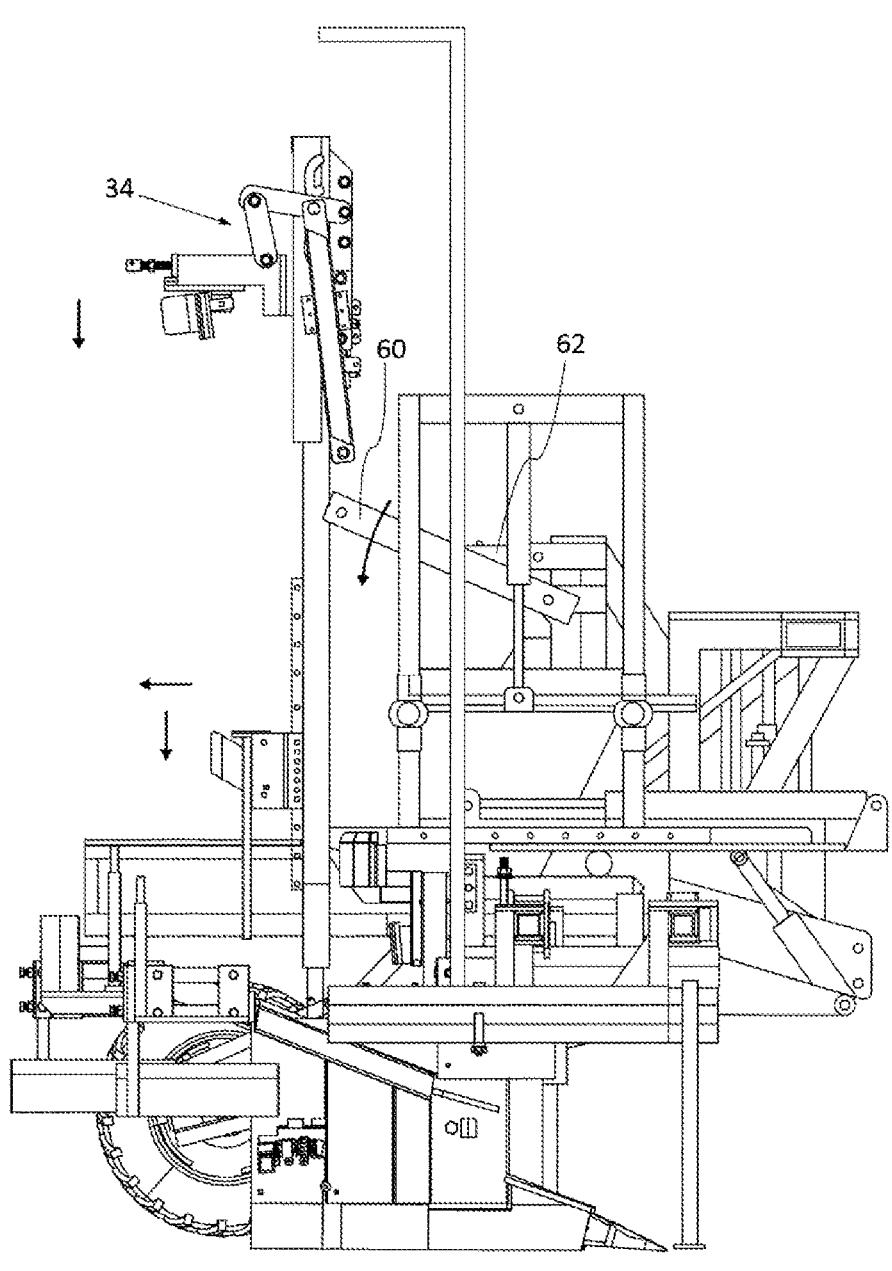

[Fig 7C]
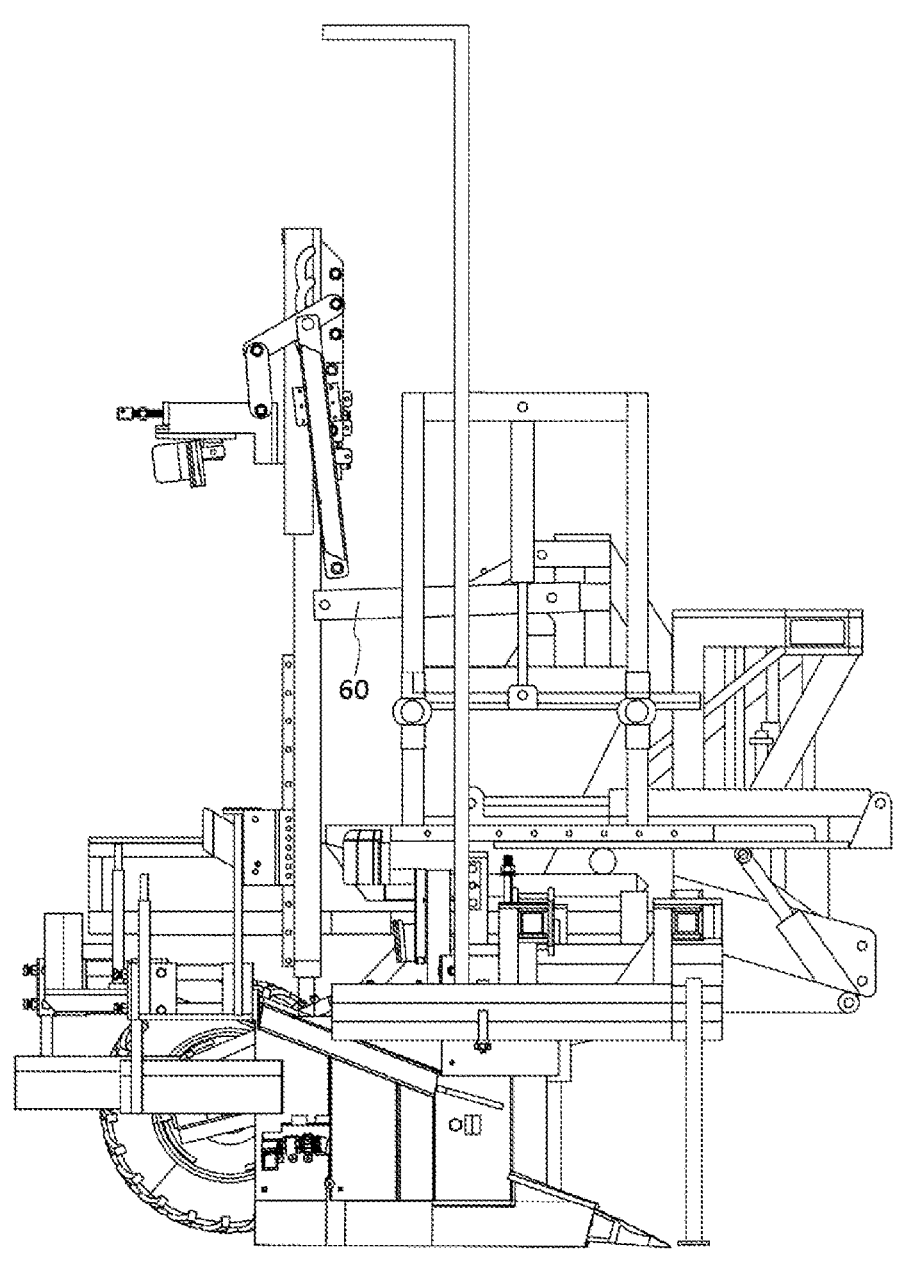

[Fig 8A]
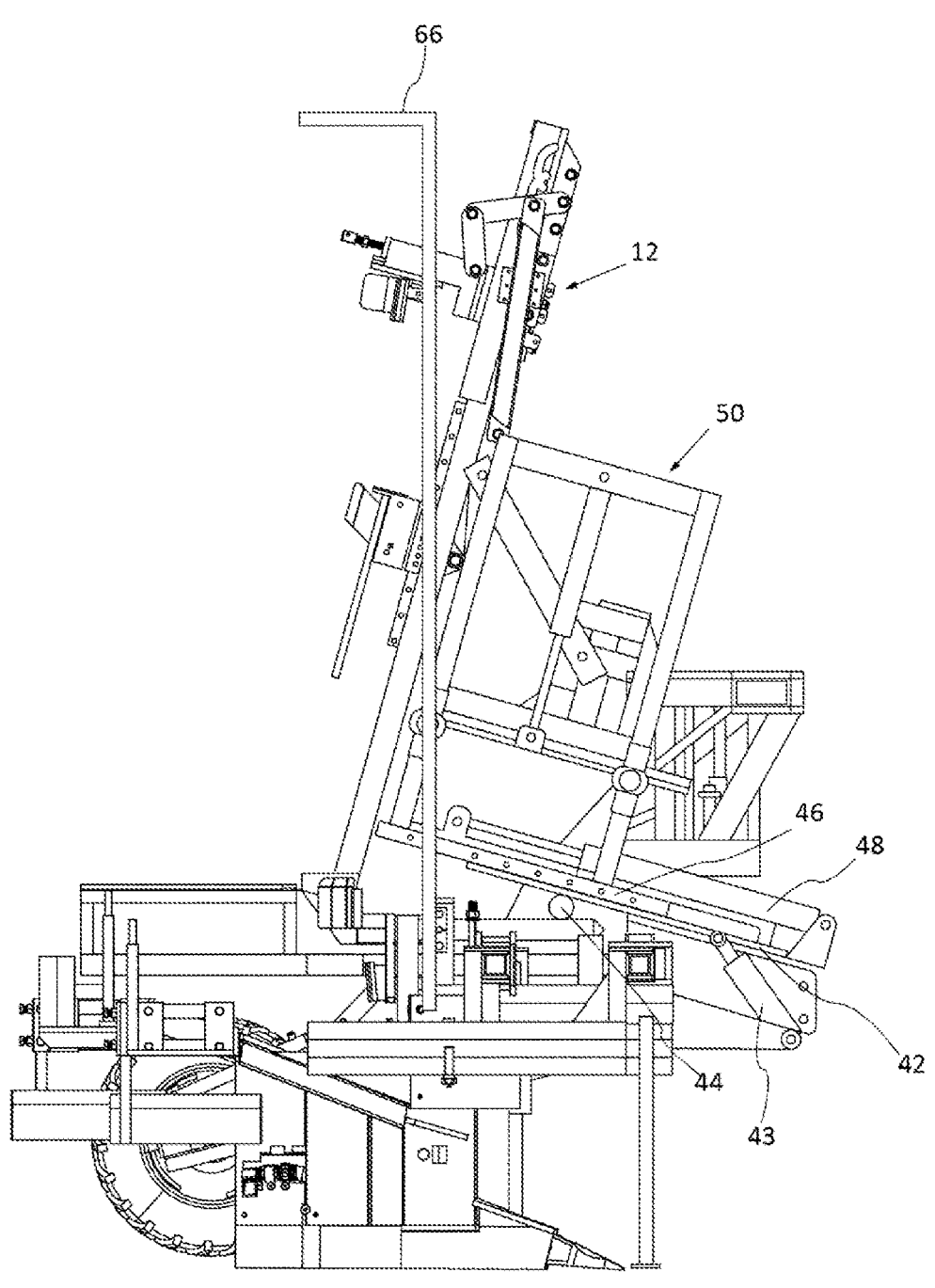

[Fig 8B]
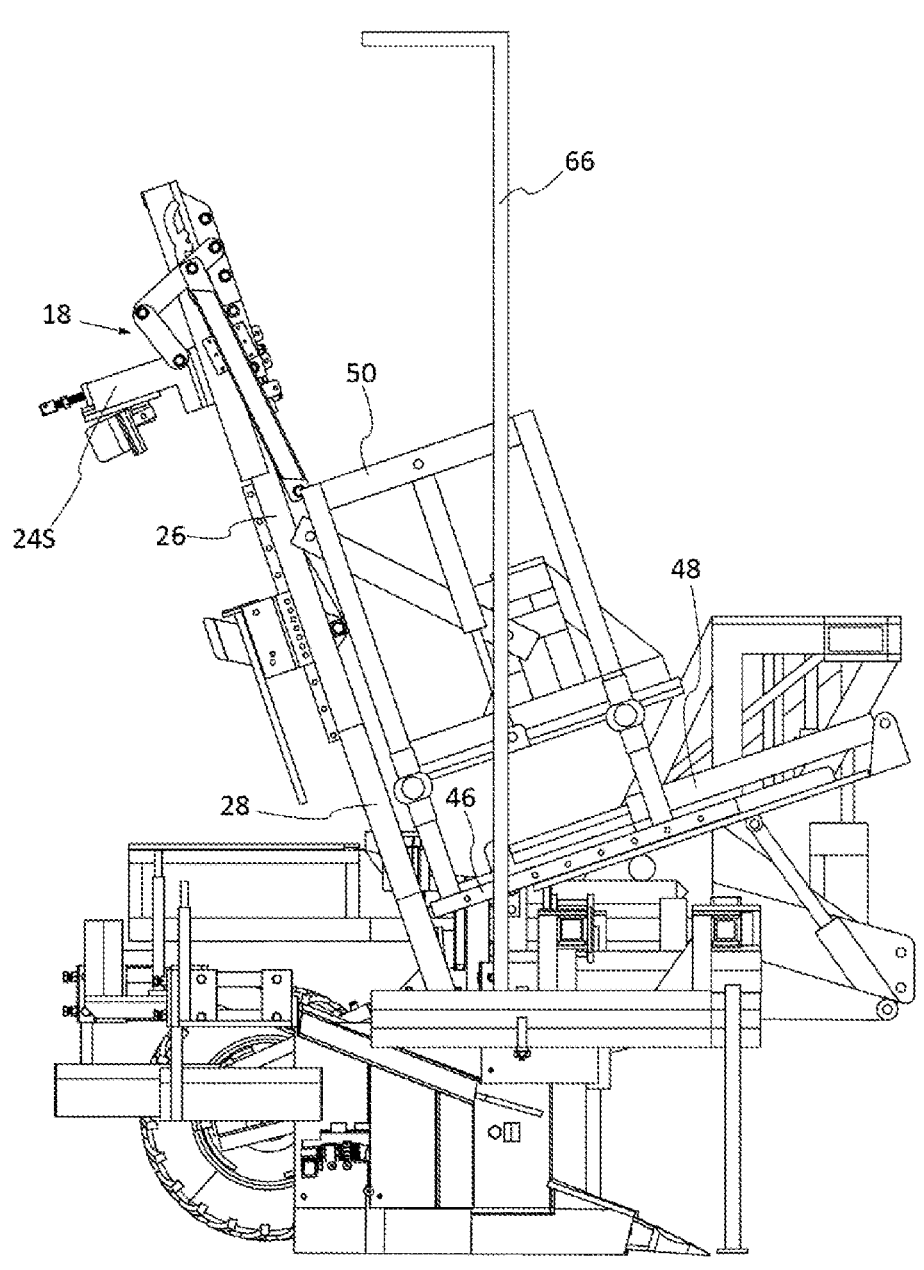

[Fig 9]
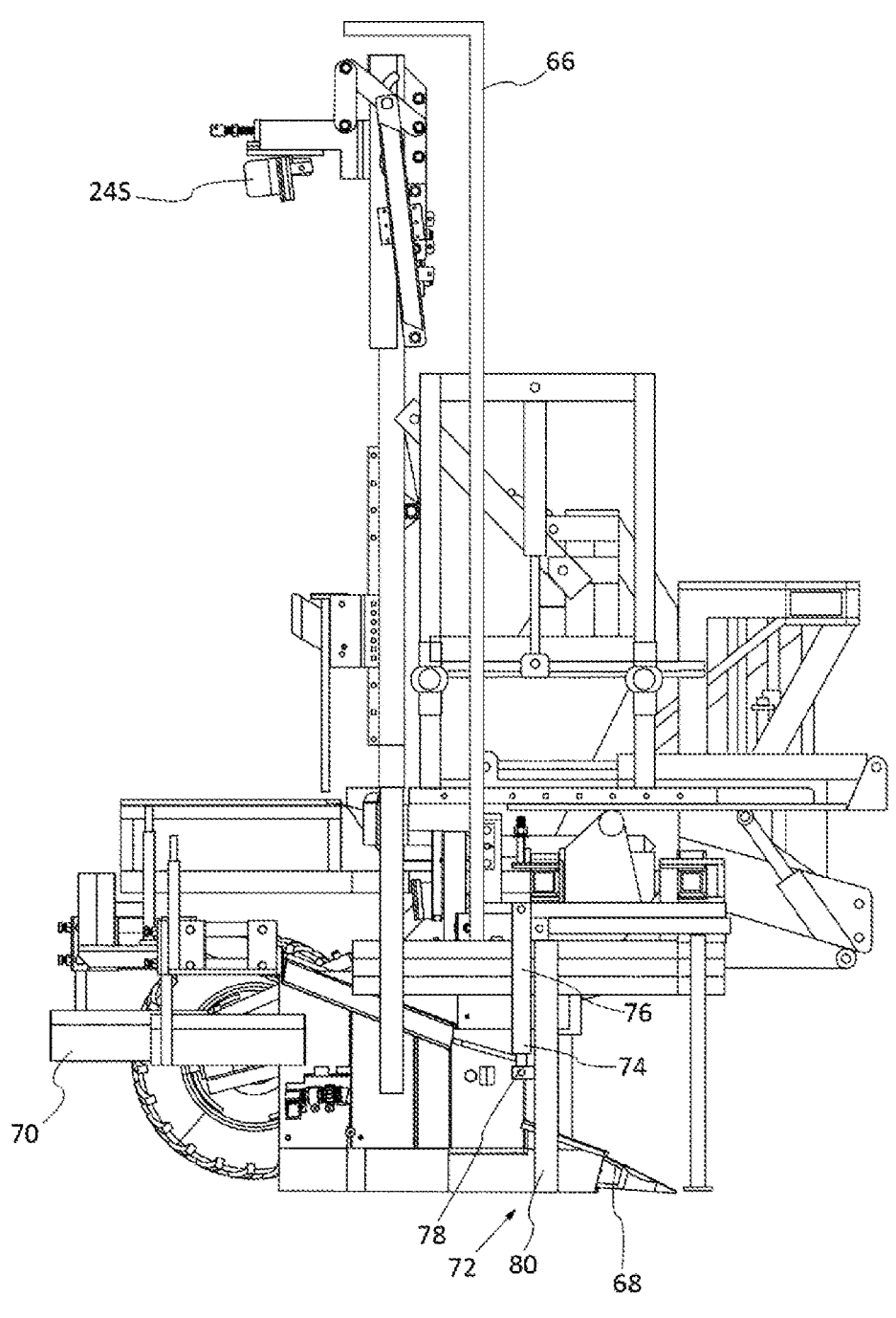

COUPLED MULTI-PURPOSE DEVICE, FOR THE RUNNING INSTALLATION OF VINEYARD ACCESSORIES, IN PARTICULAR STAKES

The invention relates to a device, in particular a multi-purpose device, coupled, for the running installation of vineyard accessories, in particular the stakes and/or markers, of different dimensions and with different depths of driving-in, with means for correcting slope in the different directions and for correcting the point of planting of said stake and/or marker. The invention also relates to means for correcting slope, opening a furrow, means for depositing tying wire, means for fertilizing, depositing a drip tube. All of these operations are carried out simultaneously.

It is known that planting a vineyard requires various time-consuming operations. On a given plot delimited by coordinates accessible to satellite positioning devices, the planting is determined as a function of numerous parameters such as sunshine, the variety of plants, the size type, the tying, the width between rows, to name but a few. Once the data has been set, they are introduced into a planting software intended to control the various means of the device according to the present invention. The same software also controls the movement of the traction means in terms of the speed and direction of the coupled device according to the present invention, which is totally automatic with or without a operator/driver present.

The operations to be carried out to plant a vineyard consist of tracing a furrow, placing a plant, and driving in a marker, immediately juxtaposed with the plant. This marker is intended to guide said plant in the first few months. The planting is carried out according to the planting scheme of the software, that is to say with a given spacing, a given depth, according to the nature of the soil and the length of the marker; there are truly different needs which the device according to the present invention must address in to be usable in different vineyards and in different terrain. Whatever the slope and the tilt, this marker must be driven in vertically so that the grapevine plant develops vertically like all the plants and so that the marker can act as a guide.

The complement of a planting of the vine on the plot consists of placing stakes intended to support the tying wires and to unwind the tying wires themselves along the stakes. Again, depending on the nature of the soil, type of vineyard crop, variety, and height in particular, it is necessary to use stakes of given length and to proceed with a driving-in that is also adapted as a function of this length. The planting scheme is different since the stakes are higher for their above-ground part and more spaced apart than the markers since it is necessary to have a stake every 3 or 4 vines in order to give a general idea, therefore every 3 or 4 markers. Again, the stakes must be installed vertically, regardless of the inclination of the ground in all directions and advantageously with vertices at the same height relative to the ground for a homogeneous tying of the vines of the plot. Indeed, this is particularly important for future vine maintenance operations, in particular when they are mechanized, such as pre-cutting, machine-harvesting when this is done, or even pre-sizing the branches before winter pruning. The stakes may be made of metal, wood or a composite material, the markers generally also being made of the same materials as the stakes.

Likewise, once the positioning of the stakes has been carried out, it is necessary to unwind several tying wires intended to be attached to said stakes, for some in a secured manner and for others in a removable manner, in order to be able to place them on land during various vine maintenance tasks.

On the one hand, with the same coupled multi-purpose device, according to the present invention, the operator can ensure the installation of these accessories simultaneously with the installation of the stakes and markers. Better still, it can carry out installations on terroirs and with different varieties of grapes. If the operator is a service company for the planting of grapevines, or a winemaking contractor, it is easy, through adjustment options, to work different terroirs and different varieties with the same device. Versatility is extremely attractive not for the amortization of the equipment, but also for the ergonomic working qualities, since the device according to the invention limits human interventions and prevents musculoskeletal disorders.

The aim of the present invention is also to be able to generate a planting furrow, to ensure the putting into earth of the grapevine seedlings, the watering and the covering of the planting furrow generated.

Additionally, the installation of the stakes and/or marking, accompanied by their plants, regardless of the configuration of the terrain, with a regular spacing, a certain verticality and a defined height that is constant.

Another problem arises when driving in the stakes and markers. The markers are installed in the furrow, or about ten further centimeters deep. The markers encounter little obstacle to driving in, such as stones. Stakes that are driven in 60 to 80 cm deep would regularly encounter stones, especially in certain types of soil. These stones would oppose their driving-in. It is therefore necessary to ensure that the stones have been separated from the line in which the stakes and therefore also markers are being installed, even in depth.

For these purposes, the subject of the invention is a multi-purpose device, for the running installation of vineyard accessories, in particular stakes/markers, comprising a frame mounted on wheels and intended to be coupled to traction means, following a direction of travel F, characterized in that it comprises driving-in means with a twin hammer.

More particularly, the driving-in means comprise two hammers, an upper hammer and a lower hammer both mounted on a slide translationally mounted on a guide mast, and means for translationally maneuvering the upper hammer, interposed between said slide and said upper hammer.

These translational maneuvering means interposed between the slide and the upper hammer comprise a set of connecting rods and an actuator in the form of a cylinder with a fixed part, in this case the body of the cylinder rigidly connected to the slide and a movable part, in this case the rod of the cylinder, of the action connecting rods, arranged in pairs, pivotably mounted by one of their ends on either side of the slide, in holes formed in a plate integral with said slide, the other ends of the action connecting rods being pivotably mounted on the slide by means of transfer connecting rods, mounted in pairs, attached to the free end of the action connecting rods, the transfer connecting rods each having the other end pivotably mounted on the upper hammer, so as to generate a translational movement of the upper hammer with respect to the slide upwards or downwards.

The driving-in means comprise in particular a mounting appendage on the frame and means for correction with a plate pivotably mounted about a pivot axis relative to the frame, oriented transversely relative to the direction of travel F and pivoting means, interposed between said plate and said frame so as to be able to tilt the plate about the pivot axis.

According to another characteristic, the plate carries a tray, translationally mounted relative to said plate, and means for translationally maneuvering said plate, in the direction of travel F.

In a complementary manner, the tray bears an elevator with a framework comprising four uprights and four cross-members, and four sliding sleeves on the four uprights and a base, rigidly connected to said sliding sleeves with means for maneuvering said base interposed between said base and the cross-members so as to be able to raise and lower said base relative to the framework.

In addition, the base carries means for compensating for advancement comprising a pair of arms mounted pivotably relative to the base, each by one end and mounted so as to pivot relative to the slide of the driving-in means, each by the other end as well as advancement compensation maneuvering means interposed between said arms and said base so as to be able to pivot said arms.

Advantageously, the base comprises a docking cradle for sliding in the mounting appendage of the twin hammer driving-in means.

Advantageously, the frame comprises two arms, one left, the other right, each bearing a wheel and a left cylinder and a right cylinder interposed between said frame and each of the corresponding arms, so as to make it possible to correct the tilt.

Preferably, the device comprises ground-working means.

In an exemplary embodiment of the invention, the device comprises a sickle, movable heightwise so as to be able to open a furrow and to plant a vine plant at the bottom of the furrow, and skimmers, movable heightwise, to close the furrow.

Advantageously, the device comprises means for opening a deep furrow, which comprise a cylinder, oriented perpendicularly to the frame and downwards, this cylinder comprising a body and a movable rod, the body being secured to the frame so as to separate the stones and other possible obstacles from the installation line of the stakes.

The invention also relates to a multi-purpose device, for the running installation of vineyard accessories, in particular stakes and/or markers, comprising a frame mounted on wheels, each attached to a rolling arm, with tilt correction means, said device being intended to be coupled to traction means, for a movement following a direction of travel F, comprising, characterized in that it comprises:

driving-in means with at least one hammer
means of compensation for advancement,
means for compensating for the slope and the point of installation, during the driving-in, in the direction of travel, F.

More particularly, the driving-in means are mounted on a slide, itself translationally mounted on a guide mast, said mast comprising an appendage for mounting on the frame, said mounting appendage being secured to the means for correcting the slope in the direction of travel F, these means for correcting the slope comprising a plate pivotably mounted about a pivot axis relative to the frame, oriented transversely relative to the direction of travel F, and pivoting means, interposed between said plate and said frame so as to be able to tilt the plate about the pivot axis and correct the slope in the direction of travel F.

According to another characteristic, the plate carries a tray, translationally mounted relative to said plate, and means for translationally maneuvering said plate, in the direction of travel F, so as to correct the point of installation.

In particular, the tray bears an elevator with a framework comprising four uprights and four cross-members, and four sliding sleeves on the four uprights and a base, rigidly connected to said sliding sleeves with means for maneuvering said base interposed between said base and the cross-members so as to be able to raise and lower said base relative to said framework and said tray.

The base also carries advancement compensation means comprising a pair of arms mounted pivotably relative to the base, each by one end and mounted so as to pivot relative to the slide of the driving-in means, each by the other end as well as advancement compensation maneuvering means interposed between said arms and said base so as to be able to pivot said arms.

Advantageously, the base comprises a docking cradle for sliding in the mounting appendage of the driving-in means.

According to a particular arrangement, the driving-in means of the multi-purpose device, for the running installation of vineyard accessories, comprise a twin hammer.

Advantageously, the driving-in means comprise two hammers, an upper hammer and a lower hammer both mounted on a slide translationally mounted on a guide mast, and means for translationally maneuvering the upper hammer, interposed between said slide and said upper hammer.

Advantageously, the translational maneuvering means interposed between the slide and the upper hammer comprise a set of connecting rods and an actuator in the form of a cylinder with a fixed part, in this case the body of the cylinder rigidly connected to the slide and a movable part, in this case the rod of the cylinder, of the action connecting rods, arranged in pairs, pivotably mounted by one of their ends on either side of the slide, in holes formed in a plate integral with said slide, the other ends of the action connecting rods being pivotably mounted on the slide by means of transfer connecting rods, mounted in pairs, attached to the free end of the action connecting rods, the transfer connecting rods each having the other end pivotably mounted on the upper hammer, so as to generate a translational movement of the upper hammer with respect to the slide upwards or downwards.

Advantageously, the device comprises ground-working means.

In one embodiment of the invention, the device comprises a sickle, movable heightwise so as to be able to open a furrow and to plant a vine plant at the bottom of the furrow, and skimmers, movable heightwise, to close the furrow.

Advantageously, the device comprises means for opening a deep furrow, which comprise a cylinder, oriented perpendicularly to the frame and downwards, this cylinder comprising a body and a movable rod, the body being secured to the frame so as to separate the stones and other possible obstacles from the installation line of the stakes.

The present invention is now described with the aid of an embodiment that is particularly elaborate, by way of purely illustrative and non-limiting example of the scope of the invention. This description is made based on the appended drawings, in which the various figures represent:

FIG. 1 a rear perspective view of the multi-purpose device according to the present invention.

FIG. 2 a view in longitudinal section with the twin hammer highlighted in thick lines.

FIG. 3A an isolated view in side elevation of the twin hammer according to the present invention.

FIG. 3B an isolated rear perspective view of the twin hammer of FIG. 3A.

FIG. 3C an isolated front perspective view of the upper maneuvering part of the twin hammer of FIGS. 3A and 3B.

FIG. 4A a first starting position of the upper part of the maneuvering means of the twin hammer.

FIG. 4B a second position with an intermediate movement of the upper part of the maneuvering means of the twin hammer.

FIG. 4C a third position with a movement of the upper part of the maneuvering means of the twin hammer with a more advanced driving-in.

FIG. 5 a view in longitudinal section like that of FIG. 2, with the tilt correction means highlighted in thick lines.

FIG. 6 a view in longitudinal section like that of FIG. 2, with the maneuvering means of the twin hammer highlighted in thick lines.

FIG. 7A a view in longitudinal section like that of FIG. 2, of a step of operation of the twin hammer while running, at the start of driving-in.

FIG. 7B a view similar to that of FIG. 7A, of a step of operation of the twin hammer while running, but in an intermediate driving-in step.

FIG. 7C a view similar to that of FIG. 7A, of a step of operation of the twin hammer while running, but in a final driving-in step.

FIG. 8A a view of the compensation adjustment means in the position of compensating for a positive slope.

FIG. 8B a view of the compensation adjustment means compensating for a negative slope.

FIG. 9 a view of the means for producing a furrow.

The coupled multi-purpose device for the running installation of vineyard accessories, in particular stakes and/or markers, in a direction F, of different dimensions and with different depths of driving-in, is now described with reference to the various figures.

In FIG. 1, the device according to the invention comprises, mounted on a frame 10:

means 12 for driving in the stakes and/or markers,
tilt correction means 14, transversely to the direction of travel F,
means of compensation for advancement 16, relative to the travel speed of the device,
means for compensating for the slope 18 during driving-in, in the direction of travel,
means for working the earth 20, and
complementary members 22 for running installation of vineyard accessories.

FIG. 1 shows the frame 10 provided with tilt correction means 14 comprising two running arms, 10-1, one left 10-1G, the other right 10-1D, the directions of right and the left being established facing the arrow F which indicates the direction of advancement. Wheels 10-2, a left wheel 10-2G and a right wheel 10-2D, are respectively attached to each of said running arms. Tilt correction members 10-3, in this case a left cylinder 10-g and a right-hand cylinder 10-3D are interposed between said frame 10 and each of said corresponding running arms, making it possible to correct the tilt perpendicular to the direction of travel F. These cylinders are advantageously of hydraulic type. The hydraulic power comes from a traction means, not shown, such as a tractor to which said frame 10 is coupled, in a known manner.

The means 12 for driving in the stakes and/or markers are shown in FIGS. 2, 3 and 4. These driving-in means 12 comprise at least one hammer, in this case in the embodiment two hammers, an upper hammer 24S for the stakes and a lower hammer 241 for the markers, both of them mounted on a slide 26 and guided by said slides. This slide 26 is itself translationally mounted on a guide mast 28, see FIG. 3B. This guide mast 28 also comprises a mounting appendage 30, of square, anti-rotation cross-section. Means 32 for translationally moving the upper hammer 24S are interposed between the slide 26 and said upper hammer 24S so as to ensure the translational movement of said upper hammer 24S on said slide 26.

The means 32 for translationally moving the upper hammer 24S, interposed between the slide 26 and the upper hammer, comprise a set of connecting rods 34 and an actuator in the form of an actuator 36, in this case a cylinder with a fixed part, in the case in point the body of the cylinder rigidly connected to the slide 26 and a mobile part, in this case the rod of the actuating cylinder integral with the connecting rods of the set of connecting rods 34. Action connecting rods 34-1, arranged in pairs, are pivotably mounted by one of their ends on either side of the slide 26, in holes 34-2 formed in a plate 38 rigidly connected to said slide 26. This plate 38 comprises several holes at different heights in order to allow complementary stroke adjustments. The other ends of the action connecting rods 34-1 are pivotably mounted on the slide 26 via transfer connecting rods 34-3, arranged in pairs, attached to the free end of the action connecting rods 34-1. The transfer connecting rods 34-3 each have the other end pivotably mounted on the upper hammer 24S. Thus, the set of two action connecting rods and two transfer connecting rods makes it possible to generate a translational movement of the upper hammer 24S relative to the slide 26 upwards or downwards, with a demultiplied stroke, by the simple rotational movement of the set of connecting rods 34.

The actuator 36 of the set of connecting rods is interposed between the slide 26 and the thrust connecting rods 34-4, mounted in pairs. These thrust connecting rods 34-4 have an end pivotably mounted on the movable part of the actuator 36 and the other end is pivotably mounted relative to the action connecting rods 34-1, at a point located between the two ends of said connecting rods, so as to be able to pivot them relative to the axis of the holes 34-2.

The slide 26 carries in addition to the upper hammer 24S, the hammer 241 arranged in the lower part and attached securely to a securing rail 40, having a set of securing holes to allow adjustment of the initial height of said lower hammer 241 relative to the slide 26. A lower fixed guide 42 is provided at the foot of the guide mast 28.

FIGS. 4A, 4B and 4C show a synoptic diagram of the operation of the means for maneuvering the upper hammer 24S relative to the slide 26. The term "hammer" is understood to mean not a striking head, but a driving-in head pressing by means of the hydraulic actuators, but the term hammer is used in the winemaking field due to the fact that the stakes were manually driven by a hammer in earlier times. In FIG. 4A, the actuator 36 is in the closed position, in this case the rod of the cylinder is retracted. In fact, the push rods 34-4 are pivoted upwards, the action connecting rods 34-1 are pivoted upwards and the transfer connecting rods 34-3 are raised so that the upper hammer 24S is in the high position. In FIG. 4B, the actuator 36 is in the intermediate position, the push rods 34-4 are pivoted downwards, the action connecting rods 34-1 are pivoted downwards about the axis of the holes 34-2 and the transfer connecting rods 34-3 are moved downwards, driving the upper hammer towards an intermediate position, on the slide, independently of the movements of the slide which will be described subsequently. In FIG. 4C, the movements are continued, the upper hammer moves toward its maximum low position. The upper hammer is therefore brought closer to the lower hammer which is fixedly mounted relative to the slide 26.

Depending on the limit of the low position desired for the upper hammer 24S, the position of the action connecting rods 34-1 is modified in the holes 34-2. Likewise, the position of the lower hammer 241 can be adjusted on the slide 26 thanks to the rail which carries it and which is provided with adjustment holes. The two hammers are connected to the slide 26, but they can be adjusted very precisely, independently, depending on requirements.

The driving-in means 12, and more particularly the guide mast 28, are attached by the mounting appendage 30 to the frame 10 and more particularly to the tilt correction means 18 in the direction of travel F and the point of installation. These correction means 18 are attached to the frame 10 and are shown in an extra-thick line in FIG. 5. These correction means 18 comprise a plate 42 pivotably mounted about a pivot axis 44 relative to the frame 10. This pivot axis 44 is oriented transversely relative to the direction of travel F. Pivoting means 43 are interposed between the plate 42 and the frame 10 so as to be able to tilt the plate 42 about the pivot axis 44. This plate 42 itself carries a tray 46, translationally mounted relative to said plate 42, and means 48 for translationally maneuvering said tray 46 in the direction F, in this case in the form of a hydraulic cylinder interposed between the plate 42 and the tray 46. The translational movement is oriented in the direction of travel F, in both directions for a compensation of the point of installation.

The tray 46 carries an elevator 50, in this case with a framework comprising four uprights 52, four cross-members 52 and four sleeves 54 sliding on the four uprights 52. Any other solution such as a cylinder with an anti-rotation square cross-section could also be suitable. These sliding sleeves 54 support a base 56 carrying the advancement compensation means 16, said base 56 being secured to said sliding sleeves 54. Maneuvering means 58 of said base 56, in this case a pair of cylinders for the symmetry of the assembly, are interposed between the base 56 and the cross members 52 so as to be able to raise and lower said base 56 relative to the framework, which constitutes the elevator 50.

The advancement compensation means 16 are detailed in FIG. 6, shown in an extra-thick line. The advancement compensation means 16 comprise a pair of arms 60 mounted pivotably relative to the base 56 each by one end and mounted pivotably relative to the slide 26, each by the other end. Advancement compensation maneuvering means 62 are interposed between said arms 60 and the base 56 so as to be able to pivot said arms. Such advancement compensation maneuvering means 62 are in the form of a hydraulic cylinder, like the other maneuvering means. The base 56 comprises a docking cradle 64 for sliding in the mounting appendage 30 of the twin-hammer driving-in means 12. The mounting appendage 30 is thus mounted to slide between an advanced position at the beginning of the driving-in of the markers/stakes, and a retracted position at the end of the driving-in, relative to the direction of advancement shown by the arrow F. Such a block diagram is represented in the FIG. 7. Thus, in FIG. 7A, the advancement compensation maneuvering means 62 are in the closed position, that is to say that the rod of the piston of the hydraulic cylinder, in this case, is in the body of the cylinder, the arms 60 are pivoted upwards. The slide 26 with its twin hammer is in the high position on the guide mast 28, the mounting appendage 30 is driven in forward in the cradle 64. In FIG. 7B, the arms 60 pivot downwards because the advancement compensation maneuvering means 62 are in the intermediate position. The mounting appendage 30 translates into the cradle 64, towards the rear, that is to say in the opposite direction from that of the arrow F. The driving-in means 12 move towards the rear. The speed of movement towards the rear is equal to the speed of movement of the tractor vehicle and therefore of the frame 10, relative to the ground and in the direction F. The hammers 24 are then compensated for and driven in at zero speed relative to the ground. The duration of driving-in and consequently of translation of the slide 26 on the guide mast 28 is less than the duration of the rearward movement of the driving-in means 12. In FIG. 7C, the diving-in has gone far, and the driving-in means are again returned to near the maximum position according to the required driving-in times. For the return, the reverse maneuvers lead to the different moving elements to the initial position, with the advantage of being able to increase the return speeds since there is no longer any link between the speed of travel and the speed of driving-in.

During this rearward movement, generated by the pivoting of the arms the driving-in means 12 are moved towards the rear by a compensation of the advancement speed, but the movement of the arms 60, which are rigidly connected to the slide 26, also causes the driving-in by a lowering movement of the mast 28 carrying the hammers 24 and therefore the movement of the upper 24S and lower hammers 241 downwards. If it is the upper hammer 24S which is affected, because the operation is driving in a stake, for example, said upper hammer 24S can be moved by an additional stroke thanks to the translational maneuvering means 32 with its associated set of connector rods 34, interposed between the slide 26 and the upper hammer 24S.

The means for compensating for the slope 18 during the driving-in are now described with reference to FIGS. 8A and 8B. These slope compensation means 18 consist of inclining the driving-in means 12 in order to compensate for a slope, upward or downward, by also using the tilt correction means 14 simultaneously if necessary to correct said tilt. It is the base 56 which ensures the correction of upward or downward inclination. This base 56 is carried by the elevator 50 which is itself supported by the plate 42. To compensate for the slope, the plate 42, with what it supports, pivots about the pivot axis 44, under the action of the pivoting means 43 interposed between the plate 42 and the frame 10. In the present case FIG. 8A, the slope being upward, the plate 42 is pivoted forward by closing the pivoting means 43, in this case a hydraulic cylinder. Thus, the driving-in means 12, the slide 26 and the guide mast 28 remain vertical when the frame 10 is inclined in a raised manner.

There are two problems induced by this incline. Since the stake is inclined relative to the frame, it is necessary to translate all of the driving-in means 12 at an angle relative to the frame which is the reference because otherwise the point of penetration into the ground would be set back and, on the other hand, the driving-in height would be modified since the lower tip of the stake is higher than the ground since there is an angle of inclination. It is therefore necessary to bring the driving-in means 12 closer to the ground in order to install in the ground at the precise point of installation provided and to lower the driving-in means 12 on the other hand, in order to come into contact with the ground. These actions are carried out by implementing the correction means 18.

The elevator 50 modifies the height of the driving-in means 12 by acting on the maneuvering means 58 of said base 56. In FIG. 8A, the slope is rising and the driving-in means 12 must be pivoted forward so that the stake is vertical. Under such circumstances, the correction means 18 are used.

The plate 42 is pivoted by the action of the maneuvering means 43, in this case a cylinder which is closed, i.e. the rod of the cylinder retracts into the body of the cylinder. The pivoting plate 42 tilts the tray 46 which carries the elevator 50 and the twin-hammer driving-in means 12. Since the tray 46 is mounted so as to be translationally mobile relative to the plate 42, is moved by the maneuvering means 48 of said plate in order to move the driving-in means 12 forward, and therefore the stake and/or the marker, which compensates for the inclination of the frame linked to the slope. In order to compensate for the height offset relative to the ground and inherent in the inclination relative to the frame, the elevator 50 is used to move the guide mast 28 carrying the slide 26, in the present case downwards. All the parameters modified by the slope are corrected and the stake is thus installed at the given point, at the given depth, vertically, while running. The driving-in maneuver is in no way modified.

In the case where the frame is downward-sloping, see FIG. 8B, the maneuvers are exactly the same, but in reverse.

It should be noted that any tilt is corrected by the actuators 10-3G and 10-3D which compensate for the arms 10-1G and 10-1D carrying the wheels 10-2G and 10-2D, which act as feeler wheels. The frame 10 is therefore always horizontal, relative to the transverse axis, that is to say perpendicular to the direction of the arrow F. A correction of the installation height is also provided since the stake is higher than on flat terrain. The installation of the stake is therefore corrected in verticality relative to the slope along the axis of travel F but also perpendicularly to this direction of travel F.

All the maneuvers of the cylinders are centralized by a software program which, on the basis of movement sensors of each of the movement means, in this case the cylinders, position sensors, speed values of movement and GPS indications, automates the commands of each of the actuators, leaving the operator of the pulling means such as a tractor, free for increased monitoring. The automatic piloting of the pulling means is also available, like on many agricultural vehicles. For this purpose, a GPS antenna can be mounted on the support mast 66, erected for this purpose and rigidly connected isostatically with the frame in order to have a precise value. Given the data entered into the software concerning installation, the software indicates, for example, on a LED ramp (light-emitting diodes) green colors when the installation relates to a stake, or red colors when the installation relates to a marker.

The multi-purpose device coupled, for the running installation of vineyard accessories, makes it possible, in addition to the running installation of the stakes and markers in a single pass, via the earth-working means 20, to open a furrow for planting the grapevine plants, to water them, to open a deep furrow for the installation of the stakes and to close the furrow. For this purpose, in FIG. 9, these ground-working means comprise a sickle 68, movable heightwise so as to be able to open a furrow 20 to 30 centimeters deep. This furrow makes it possible to plant a vine plant at the bottom of the furrow and to spray by means of a water reservoir, a valve and a distribution tube, arranged in the lower portion and not detailed, since they are generally known by those skilled in the art. Advantageously, the dispensing tube is positioned behind the point where the plant is planted so as to be able to distribute a dose of water in the furrow, substantially in line with the plant before the closing of the furrow by means of skimmers 70, mobile in height, arranged at the rear and visible in FIG. 1, in particular. According to the present invention, means 72 for opening a deep furrow may also be provided, which comprise a cylinder 74, oriented perpendicularly to the frame 10 and downwards. This cylinder 74 comprises a body 76 and a mobile rod 78, the body being secured to the frame 10. The mobile rod 78 carries a narrow sickle and can assume a maximum protruding position, at least equal to the complementary depth of that of the furrow for driving in a stake. The narrow sickle 80 makes it possible to extend the depth of the furrow from 20 to 30 centimeters up to 60 to 70 centimeters, to give a general idea. The purpose of this narrow sickle 80 is to separate the stones and other potential obstacles from the installation line of the stakes, guaranteeing the driving-in of all the stakes.

In addition, it is possible to laterally add to the multi-purpose device according to the present invention, tying wires and/or drip pipes, an amendment spreader for a perfect recovery of the planted vine, an amendment dose being distributed in parallel with watering.

The device comprises, in a known manner, stake racks and markers.

The operation of the multi-purpose device according to the present invention is now described with respect to all of the figures. The device is served by a driving operator, if necessary, as well as by at least two assistants, the first serving to supply markers and pins and the second serving to ensure the placement of the plants. The multi-purpose device advances, pulled by the pulling means, driven by the driving operator, if necessary, optionally with GPS. The upper 24S and lower hammers 241 are set to ensure that the markers are placed at a given height and at a depth that is also determined. The software is configured for given spacings, a number of markers defined between two stakes, a depth of the furrow, a depth of the narrow sickle, a given dose of water, an amount of amendment, etc. The corrections related to the slope are calculated permanently by the software, as a function of the data of the sensors. In the same way, the transverse horizontality adjustment by means of the feeler wheels are parameters fixed in permanent memory and not configurable by the operators and assistants. Only the parameters related to the relevant plot are modifiable.

The unwinding of the tying wires and/or drip pipe is carried out in parallel. The device according to the present invention is multi-purpose and especially allows the same insertion device to install in a single pass the stakes, markers, and plants, in addition to other possible actions.

The invention claimed is:

1. A multi-purpose device for the running installation of vineyard accessories, in particular stakes/markers, comprising a frame mounted on wheels and intended to be coupled to traction means, following a direction of travel, the device further comprises driving-in means with a twin hammer, wherein the driving-in means comprise two hammers, an upper hammer and a lower hammer, both hammers being mounted on a slide, the slide being translationally mounted on a guide mast, and means for translational movement of the upper hammer interposed between the slide and the upper hammer.

2. The multi-purpose device for the running installation of vineyard accessories according to claim 1, wherein the translational maneuvering means interposed between the slide and the upper hammer comprise a set of connecting rods and an actuator in the form of a cylinder with a fixed part, in this case the body of the cylinder rigidly connected to the slide and a movable part, in this case the rod of the cylinder, of the action connecting rods, arranged in pairs, pivotably mounted by one of respective ends on either side of the slide, in holes formed in a plate rigidly connected to said slide, opposite ends of the action connecting rods being pivotably mounted on the slide by means of transfer connecting rods, mounted in pairs, attached to the free end of the action connecting rods, the transfer connecting rods each having the other end pivotably mounted on the upper hammer, so as to generate a translational movement of the upper hammer with respect to the slide upwards or downwards.

3. The multi-purpose device for the running installation of vineyard accessories according to claim 1, wherein the driving-in means comprise a mounting appendage on the frame.

4. The multi-purpose device for the running installation of vineyard accessories according to claim 1 further comprises means for correction with a plate pivotably mounted about a pivot axis relative to the frame, oriented transversely relative to the direction of travel F, and pivoting means, interposed between said plate and said frame so as to be able to tilt the plate about the pivot axis.

5. The multi-purpose device for the running installation of vineyard accessories according to claim 4, wherein the plate carries a tray, translationally mounted relative to said plate, and means for translationally maneuvering said tray, in the direction of travel F.

6. The multi-purpose device for the running installation of vineyard accessories according to claim 5, wherein the tray carries an elevator with a framework comprising four uprights and four cross-members, and four sleeves sliding on the four uprights and a base, rigidly connected to said sleeves sliding with means for maneuvering said base interposed between said base and the cross-members so as to be able to raise and lower said base relative to the framework.

7. The multi-purpose device for the running installation of vineyard accessories according to claim 6, wherein the base carries advancement compensation means comprising a pair of arms mounted pivoting relative to the base, each by one end and mounted pivoting relative to the slide of the driving-in means, each by the other end as well as advancement compensation maneuvering means interposed between said arms and said base so as to be able to pivot said arms.

8. The multi-purpose device for the running installation of vineyard accessories according to claim 6, wherein the base comprises a receiving cradle for sliding the mounting appendage of the twin-hammer driving-in means.

9. The multi-purpose device for the running installation of vineyard accessories according to claim 6, wherein the frame comprises two arms, one left, the other right, each bearing a wheel and a left cylinder and a right cylinder interposed between said frame and each of the corresponding arms, so as to allow correction of the tilt.

10. The multi-purpose device for the running installation of vineyard accessories according to claim 1 further comprises means for working the earth.

11. The multi-purpose device for the running installation of vineyard accessories according to claim 10 further comprises a sickle, movable heightwise so as to be able to open a furrow and to plant a vine plant at the bottom of the furrow, and skimmers, movable heightwise, to close the furrow.

12. The multi-purpose device for the running installation of vineyard accessories, according to claim 11 further comprises means for opening a deep furrow, which comprise a cylinder, oriented perpendicularly to the frame and downwards, this cylinder comprising a body and a movable rod, the body being secured to the frame so as to separate the stones and other possible obstacles from the installation line of the stakes.

13. A multi-purpose device for the running installation of vineyard accessories, in particular stakes/markers, comprising:

a frame mounted on wheels and intended to be coupled to traction means, following a direction of travel;

driving-in means with a twin hammer;

means for correction with a plate pivotably mounted about a pivot axis relative to the frame, oriented transversely relative to the direction of travel F, and pivoting means, interposed between said plate and said frame so as to be able to tilt the plate about the pivot axis, the plate carries a tray, translationally mounted relative to the plate, and means for translationally maneuvering the tray, in the direction of travel F, the tray carries an elevator with a framework comprising four uprights and four cross-members, and four sleeves sliding on the four uprights and a base, rigidly connected to the sleeves sliding with means for maneuvering the base interposed between the base and the cross-members so as to be able to raise and lower the base relative to the framework.

14. The multi-purpose device for the running installation of vineyard accessories according to claim 13, wherein the base carries advancement compensation means comprising a pair of arms mounted pivoting relative to the base, each by one end and mounted pivoting relative to the slide of the driving-in means, each by the other end as well as advancement compensation maneuvering means interposed between said arms and said base so as to be able to pivot said arms.

15. The multi-purpose device for the running installation of vineyard accessories according to claim 13, wherein the base comprises a receiving cradle for sliding the mounting appendage of the twin-hammer driving-in means.

16. The multi-purpose device for the running installation of vineyard accessories according to claim 13, wherein the frame comprises two arms, one left, the other right, each bearing a wheel and a left cylinder and a right cylinder interposed between said frame and each of the corresponding arms, so as to allow correction of the tilt.

* * * * *